Sept. 1, 1964 R. H. DUNHAM 3,147,017
VACUUM GRIPPER
Filed Sept. 5, 1962
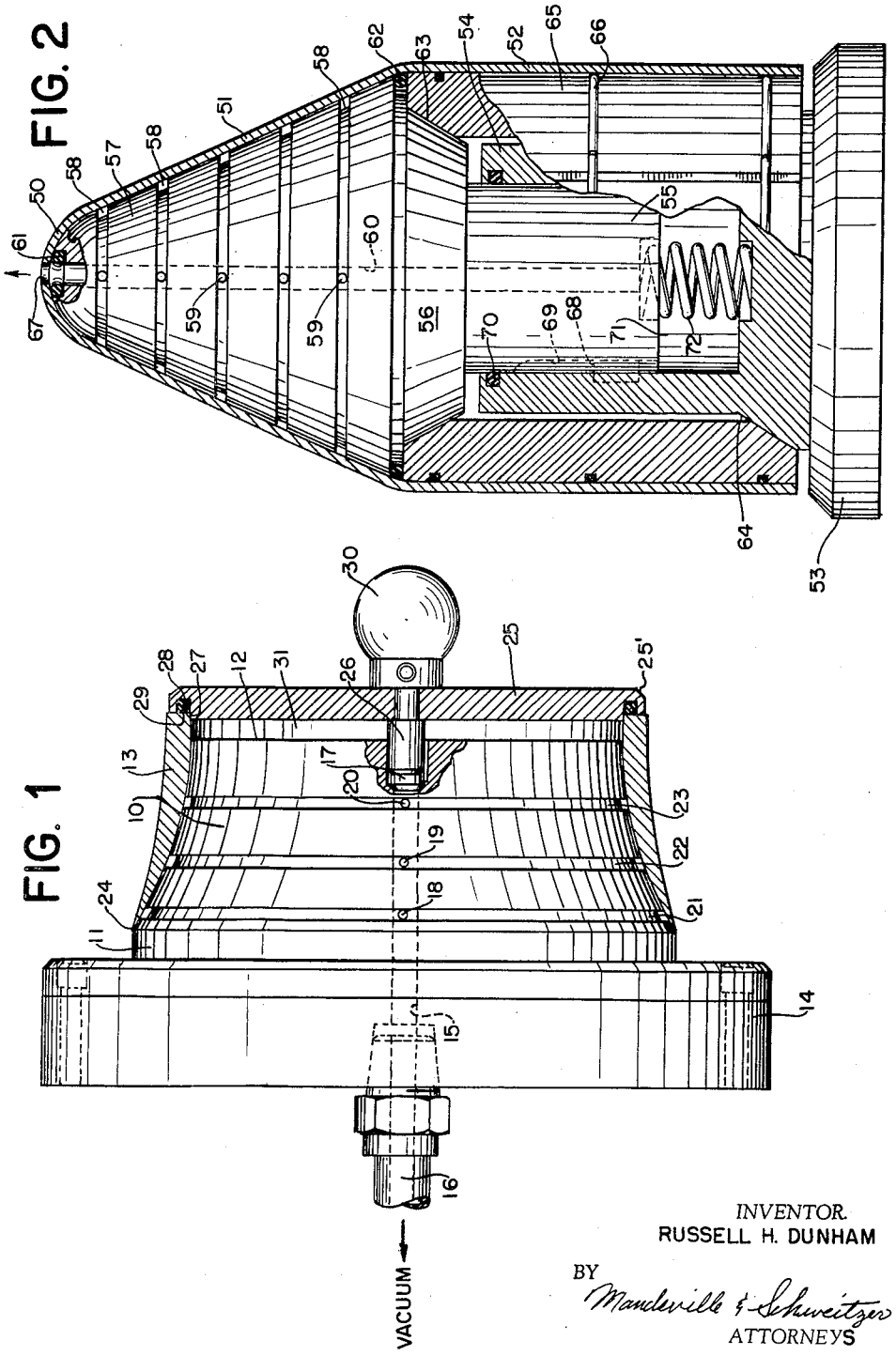
INVENTOR.
RUSSELL H. DUNHAM
BY *Mandeville & Schweitzer*
ATTORNEYS

United States Patent Office

3,147,017
Patented Sept. 1, 1964

3,147,017
VACUUM GRIPPER
Russell H. Dunham, New Fairfield, Conn., assignor to The Dunham Tool Company, Inc., New Fairfield, Conn., a corporation of Connecticut
Filed Sept. 5, 1962, Ser. No. 221,585
7 Claims. (Cl. 279—3)

The present invention relates to vacuum grippers or chucks, and is directed more particularly to improvements in vacuum-actuated chucks for gripping annular workpieces and the like.

In its broader aspects, the present invention is directed to the provision of a novel and improved vacuum-actuated chuck for gripping annular workpieces, in which a vacuum-actuated piston-like element acts upon the workpiece to maintain the workpiece advantageously gripped and supported on the chuck. However, while the piston-like element of the chuck does provide for a certain amount of "mechanical" gripping of the workpiece, substantial gripping action is achieved through the application of vacuum to the workpiece.

In one specific form of the invention, a generally tapered chuck body is provided for reception internally of a generally tapered, annular workpiece. A vacuum-actuated, piston-like element is arranged to press the workpiece onto the tapered chuck body, simultaneously providing a certain amount of "mechanical" gripping, but more importantly establishing solid support and good sealing for establishing and maintaining a vacuum gripping relationship between the chuck body and the annular workpiece.

In a second form of the invention, a vacuum-actuated piston-like element grips the workpiece by a vacuum and, when so gripping the workpiece, acts in the capacity of a piston to urge segmented chuck sections into gripping and supporting relation to other portions of the workpiece.

While the vacuum chuck of the invention is not so limited in its usefulness, it finds particularly advantageous application in the gripping of various thin-walled rocket parts, such as nozzle skirts, nose cones and the like for various machining operations, it being understood that such parts are often of large diameter, while at the same time being of extremely thin-walled and/or fragile construction, rendering gripping and handling of such parts an extremely difficult operation, which, however, is accomplished easily, effectively and efficiently by the means of the invention.

For a better understanding of the invention, reference should be made to the following detailed description and to the accompanying drawing, in which:

FIG. 1 is an elevational view, partly in section, of a first advantageous form of the new vacuum-actuated chuck; and FIG. 2 is an elevational view, partly in section, of a second advantageous form of the new vacuum-actuated chuck.

Referring now to the drawing, and initially to FIG. 1 thereof, the reference numeral 10 designates generally a chuck body having a base portion 11 and an outer end 12. The chuck body typically is a body of revolution and is of generally tapered form, being of larger diameter at its base 11 than at its outer end 12. In the specific, illustrated device, the tapered outline of the chuck body is curved, it being understood, however, that the specific surface contour of the chuck body is shaped to mate substantially with the inner wall surface of an annular workpiece 13 to be gripped by the chuck.

The chuck body 10 is supported by a base plate 14, arranged to be mounted in or gripped by a lathe, milling machine, etc., and the base plate and chuck body are bored centrally, as indicated at 15, for connection at the base plate end with a vacuum pipe 16 connected to a suitable vacuum pump (not shown).

The bore 15 extends throughout the length of the assembly, communicating at its outer extremity with an enlarged cylindrical recess 17, connecting at various points over the axial length of the chuck body with radial bores 18–20, the number and location of which are a function of the size and shape of the workpiece 13 to be handled.

In accordance with the invention, the chuck body 10 is provided with a plurality of annular grooves or recesses 21–23, communicating with the radial bores 18–20 respectively. The annular grooves 21–23 (the specific number and location of which depends upon the size and nature of the work being handled) are located in axially spaced relation, with the grooves 21–23 at opposing ends being spaced inward from the effective ends of the chuck body. In this respect, the "effective" ends of the chuck body are determined by the extremes of the area of contact between the inner wall of the workpiece 13 and the outer surface of the chuck body 10. Thus, in the specific device of FIG. 1, the inner effective end is determined by the inner end extremity 24 of the workpiece, while the effective outer end is the end extremity of the chuck body.

In accordance with a significant aspect of the invention, a piston-like element 25, advantageously in the form of a disc, is loosely supported in the end of the chuck body, by means of a guide pin 26 received in the recess 17, which may be considered a guide recess. Near its outer edge, the disc or plate 25 has an annular shoulder 27 arranged to be received closely within the internal wall of the workpiece 13. In addition, the plate is provided with an annular groove 28 receiving an O-ring sealing element 29 positioned to be brought into sealing engagement with the end surface of the annular workpiece 13.

In the operation of the vacuum-actuated chuck of FIG. 1, the annular workpiece 13 is applied over the chuck body 10, in snug-fitting relation, whereupon the plate 25 is applied over the end of the chuck body in the manner shown in FIG. 1, the handling of the plate being facilitated by a handle or knob 30. While the plate 25 is held in place over the end of the chuck body and workpiece, vacuum is applied to the tube 16, and thereby to the annular grooves 21–23 and to the enlarged space 31 between the end of the chuck body and the inner surface of the plate 25.

The enlarged chamber 31 formed between the chuck body and the plate 25, being sealed off by the O-ring element 29, forms a large vacuum chamber, such that substantial axial pressure is applied to the workpiece 13 through the circumferential end portions 25' of the plate 25, the latter acting, in effect, like a piston.

The workpiece 13, being thus urged axially onto the chuck body, by the piston-like plate 25, is sealed firmly on the chuck body, so that the fragile or delicate walls of the workpiece are properly supported and so that proper sealing is established between the inner wall of the workpiece and the outer surface of the chuck body, enabling vacuum seals to be established about the recesses 21–23. This causes the workpiece 13 to be gripped securely on the chuck body, not only by mechanical friction derived from the action of the piston-like element 25, but also by the action of the vacuum created in the grooves 21–23.

The vacuum-actuated chuck of FIG. 1 is particularly effective in gripping firmly and efficiently annular workpieces of delicate construction, the chuck having been used to particular advantage in the chucking and machining of annular ceramic nozzle skirts for rockets, for example.

In the form of the invention illustrated in FIG. 2, novel arrangements are provided particularly for the chucking and gripping of rocket nose cone elements, for example, a typical such element being designated by the reference numeral 50 and being shown to comprise an upper, conical portion 51 and a lower, cylindrical portion 52, it being understood that the construction of the nose cone element typically is of a thin-walled metal form, being highly delicate in its unsupported condition. The chuck of FIG. 2 comprises a base plate 53, arranged to be mounted on a turn table or the like, and which supports a cylindrical extension 54.

Received within the cylinder-like interior of the extension 54 is the cylindrical lower end section 55 of a piston-like member generally designated by the numeral 56, the piston-like element having a generally conical upper end portion 57 exposed above the extension 54. The conical upper portion of the piston element is provided with a plurality of annular recesses 58, each of which communicates with a radial bore 59 extending into a central, vertical bore 60, the latter advantageously extending vertically throughout the entire piston-like element 56.

At the extreme upper end of the conical section 57, a recess is provided to receive an O-ring sealing element 61, and an annular recess is provided at the lower end of the conical section to receive an O-ring sealing element 62.

At the base of the conical upper section 57 of the piston-like element, is a downwardly facing frustoconical surface 63, and a similar surface 64, facing in the opposite direction, is provided at the base of the cylindrical extension 54. A plurality of longitudinally extending cylindrical segments 65 surround the extension 54 and engage the respective frustoconical surfaces 63, 64 to provide a substantially cylindrical, expandable lower portion of the chuck. The plurality of cylindrical segments 65 are held in predetermined position against the opposed frustoconical surfaces 63, 64 by means of a plurality of circumferentially disposed springs 66 received in appropriate grooves in the assembled segments. Advantageously, the curvature of the segments 65 is such that a substantially perfect cylinder is formed, except for minor gaps between segments, when the segments are expanded to a predetermined diameter calculated properly to grip the cylindrical lower section 52 of the nose cone section by its interior wall.

In accordance with the invention, the upper portion 57 of the chuck is arranged to closely receive the conical upper portion of the nose cone section, forming a seal therewith at the O-rings 61, 62, such that substantial vacuum gripping is provided by the annular grooves 58. A suitable vacuum source, not specifically shown, advantageously is connected to the upper end of the vertical bore 60, through an end opening 67 in the nose cone element. However, where appropriate, the vacuum may be supplied to the base 53 of the chuck.

As shown in FIG. 2, the cylindrical section 55 of the piston-like element 56 is closely received in the cylindrical projection 54, being keyed thereto by means of a key 68 and longitudinal grooves 69, and advantageously being sealed by means of a surrounding O-ring 70 at the upper end of the cylindrical projection. Accordingly, when vacuum is applied to the vertical bore 60, a chamber 71 formed at the bottom of the cylindrical projection 54 is evacuated, drawing the piston-like element 56 downward and thereby expanding the gripping segments 65 radially outward into contact with the side wall of the nose cone section. The downward movement of the piston-like element is resisted by a spring 72, which serves to return the element in an upward direction when the vacuum is released.

It should be particularly noted that the evacuation of the chamber 71 requires the closing off of the various radial bores 59, and therefore depends upon the prior vacuum gripping of the conical upper section of the nose cone by the conical upper section 57 of the piston-like element. Accordingly, at such time as the element 56 functions in the capacity of a piston to expand the chuck segments 65, the nose cone section 50 is necessarily firmly gripped by its upper section.

In either of its principal forms, the vacuum-actuated chuck of the invention utilizes a piston-like element which is subjected to vacuum after a first, preliminary vacuum gripping of the workpiece, and which thereafter serves to seat and support the workpiece firmly and uniformly, enabling highly delicate and/or fragile, thin-walled cylindrical workpieces to be gripped for grinding, machining or other operations with great facility.

It should be understood, however, that the specific forms of the invention herein illustrated and described are intended to be representative only, and certain changes may be made therein without departing from the clear teachings of the disclosure. Accordingly, reference should be made to the following appended claims in determining the full scope of the invention.

I claim:

1. A work holding apparatus for holding in a fixed relation to a reference surface an object having an annular, internal surface comprising,
    (a) a gripper body associated with said reference surface and having a generally annular external surface adapted to mate with the internal surface of a workpiece to be held,
    (b) said gripper body defining at least one circumferential groove at the external surface thereof,
    (c) vacuum actuated piston means,
    (d) passage means connecting said groove and said piston means to a source of vacuum,
    (e) mechanical means movable relative to said gripper body and actuable by said piston means to exert holding forces on a workpiece placed over said gripper body,
    (f) said groove being adapted to be sealed from the atmosphere by a workpiece placed over said gripper body to form a vacuum-tight chamber,
    (g) said vacuum chamber accommodating the exertion of a holding force on the workpiece upon connection of said passage means to a source of vacuum,
    (h) said apparatus thereby holding said workpiece in a fixed relation with said reference surface by a combination of mechanical forces and vacuum forces.

2. The apparatus of claim 1 in which,
    (a) said mechanical means is integral with said piston means and exerts axial forces on the workpiece to urge said workpiece into more intimate contact with said gripper body.

3. The apparatus of claim 2 in which,
    (a) said piston means includes an annular shoulder adapted to be received closely within an internal wall of said workpiece, and
    (b) said mechanical means comprises circumferential portions of said piston means disposed radially outwardly of said shoulder.

4. The apparatus of claim 3 which includes,
    (a) O-ring sealing means disposed between said piston means and said mechanical means and adapted to seal said piston means from the ambient atmosphere.

5. The apparatus of claim 1 in which,
    (a) said mechanical means includes a plurality of expandable segments associated with said gripper body and adapted to contact internal surfaces of the workpiece,
    (b) said piston means is integral with said gripper body and cooperates with said expandable segments in a manner whereby axial movement of said piston effects the radial movement of said segments to expand them into more intimate contact with said workpiece.

6. A work holding apparatus for holding in a fixed relation to a reference surface an object having an annular, internally, generally diverging surface comprising,
    (a) a gripper body fixed to said reference surface and having an annular, generally converging external surface adapted to mate with the internal surface of the workpiece to be held, (b) said gripper body defining a plurality of circumferential grooves at the external annular surfaces thereof, (c) vacuum actuated piston means movable relative to said gripper body and adapted to clamp a workpiece thereon, (d) passage means connecting said grooves and said piston means to a source of vacuum, (e) said grooves being adapted to be sealed from the atmosphere by a workpiece placed over said gripper body to form a vacuum chamber, (f) said vacuum chamber accommodating the exertion of a holding force on the workpiece when said passage means is connected to a source of vacuum, (g) said apparatus thereby holding said workpiece in a fixed relation with said reference surface by a combination of mechanical forces and vacuum forces.

7. A work holding apparatus for holding in fixed relation to a reference surface an object having an annular, internally diverging surface comprising, (a) a gripper body, (b) a cylindrical supporting element having a diverging frustoconical base portion, (c) said base portion being fixed to a reference surface, (d) said cylindrical element defining a cylindrical piston chamber therein, (e) said gripper body having an annular, generally converging external surface adapted to mate with the internal surface of a workpiece to be held, (f) piston means integral with and extending axially from said gripper body, (g) said piston means having a converging frustoconical piston head portion immediately adjacent said gripper body portion, (h) a plurality of radially expandable segments arrayed substantially circularly about said cylindrical element and between the frustoconical portions of said cylindrical element and said gripper body, (i) said expandable segments having frustoconical surfaces mating with said last mentioned frustoconical portions and being adapted to be expanded radially outward into engagement with a workpiece by movement of said piston relative to said piston chamber, (j) spring means normally biasing said piston outwardly of said piston chamber, (k) circular resilient means maintaining said expandable elements in said circular array, (l) passage means connecting said grooves and said piston means to a source of vacuum, (m) said grooves being adapted to be sealed from the atmosphere by a workpiece placed over said gripper body to form a vacuum-tight chamber, (n) said vacuum chamber accommodating the exertion of holding forces on the workpiece upon the connection of said passage means to a source of vacuum, (o) said piston being moved inwardly into said chamber upon being subjected to a source of vacuum to expand said segments into engagement with a workpiece, (p) said apparatus thereby holding said workpiece in a fixed relation with said reference surface by a combination of mechanical forces and vacuum forces.

References Cited in the file of this patent

UNITED STATES PATENTS

| | | |
|---|---|---|
| 1,618,378 | Hatcher | Feb. 22, 1927 |
| 2,895,739 | Smith | July 21, 1959 |